(12) United States Patent
Hui et al.

(10) Patent No.: US 10,038,617 B2
(45) Date of Patent: Jul. 31, 2018

(54) ASYNCHRONOUS BROADCAST COMMUNICATION BASED ON TIME-BASED EVENTS IN CHANNEL-HOPPING NETWORKS

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 1037 days.

(21) Appl. No.: 13/920,661

(22) Filed: Jun. 18, 2013

(65) Prior Publication Data

US 2016/0212740 A1    Jul. 21, 2016

(51) Int. Cl.
*H04L 12/26*    (2006.01)
*H04W 4/06*    (2009.01)
*H04W 40/00*    (2009.01)
*H04W 84/18*    (2009.01)
*H04B 1/00*    (2006.01)

(52) U.S. Cl.
CPC ............... *H04L 43/16* (2013.01); *H04W 4/06* (2013.01); *H04W 40/00* (2013.01); *H04B 1/00* (2013.01); *H04W 84/18* (2013.01)

(58) Field of Classification Search
CPC ... G06K 7/0008; G01S 17/74; H04L 12/1854; H04M 13/09; H04N 21/4222; H04N 21/4383; H04W 28/0236; H04B 1/713
See application file for complete search history.

(56) References Cited

U.S. PATENT DOCUMENTS

| 4,207,468 | A | * | 6/1980 | Wilson | G01S 17/74 |
| | | | | | 250/338.1 |
| 5,953,418 | A | * | 9/1999 | Bock | H03M 13/09 |
| | | | | | 348/E7.024 |
| 2009/0002170 | A1 | * | 1/2009 | Ishikawa | G06K 7/0008 |
| | | | | | 340/572.1 |
| 2009/0003344 | A1 | * | 1/2009 | Kumar | H04L 12/1854 |
| | | | | | 370/392 |

(Continued)

OTHER PUBLICATIONS

"The Trickle Algorithm", Internet Engineering Task Force (IETF), Lewis et al. Mar. 2011.*

(Continued)

*Primary Examiner* — Andrew Lai
*Assistant Examiner* — Leon Andrews
(74) *Attorney, Agent, or Firm* — Parker Ibrahim & Berg LLP; James M. Behmke; Stephen D. LeBarron

(57) ABSTRACT

The techniques herein improve the performance of Trickle-based asynchronous broadcasts in a channel-hopping network, such as a low-power and lossy network (LLN). In particular, a plurality of channels in a channel-hopping network on which a plurality of nodes communicate is determined, and an asynchronous broadcast message is identified to transmit from a particular node. Additionally, a plurality of time-based events is determined, and in response to each time-based event, the asynchronous broadcast message is transmitted on a single selected channel of the plurality of channels per time-based event.

16 Claims, 10 Drawing Sheets

(56) References Cited

U.S. PATENT DOCUMENTS

| | | | |
|---|---|---|---|
| 2012/0005706 A1* | 1/2012 | Morris | H04N 21/4383 |
| | | | 725/40 |
| 2013/0013806 A1 | 1/2013 | Woo et al. | |
| 2013/0016758 A1 | 1/2013 | Hui et al. | |
| 2013/0016759 A1* | 1/2013 | Hui | H04B 1/713 |
| | | | 375/135 |
| 2013/0022084 A1 | 1/2013 | Vasseur et al. | |
| 2013/0094536 A1 | 4/2013 | Hui et al. | |
| 2013/0121335 A1 | 5/2013 | Hui et al. | |
| 2014/0204759 A1* | 7/2014 | Guo | H04W 28/0236 |
| | | | 370/236 |
| 2014/0337883 A1* | 11/2014 | Foote | H04N 21/44222 |
| | | | 725/34 |

OTHER PUBLICATIONS

Internet Engineering Task Force (IETF) Request for Comments: 6206, Arch Rock Corporation,"The Trickle Algorithm" Mar. 11, 2011.*

Internet Engineering Task Force (IETF) 'The Trickle Algorithm' Standards Track, Mar. 2011.*

Levis, et al., "The Trickle Algorithm", Internet Engineering Task Force, Request for Comments 5206, Mar. 2011, 13 pages, Internet Engineering Task Force Trust.

* cited by examiner

INDEPENDENT LISTENING SCHEDULES/SEQUENCES 400

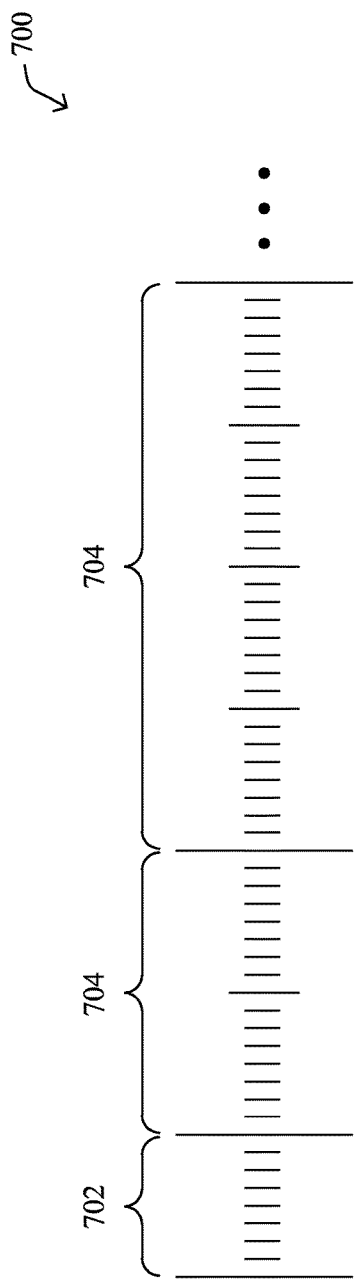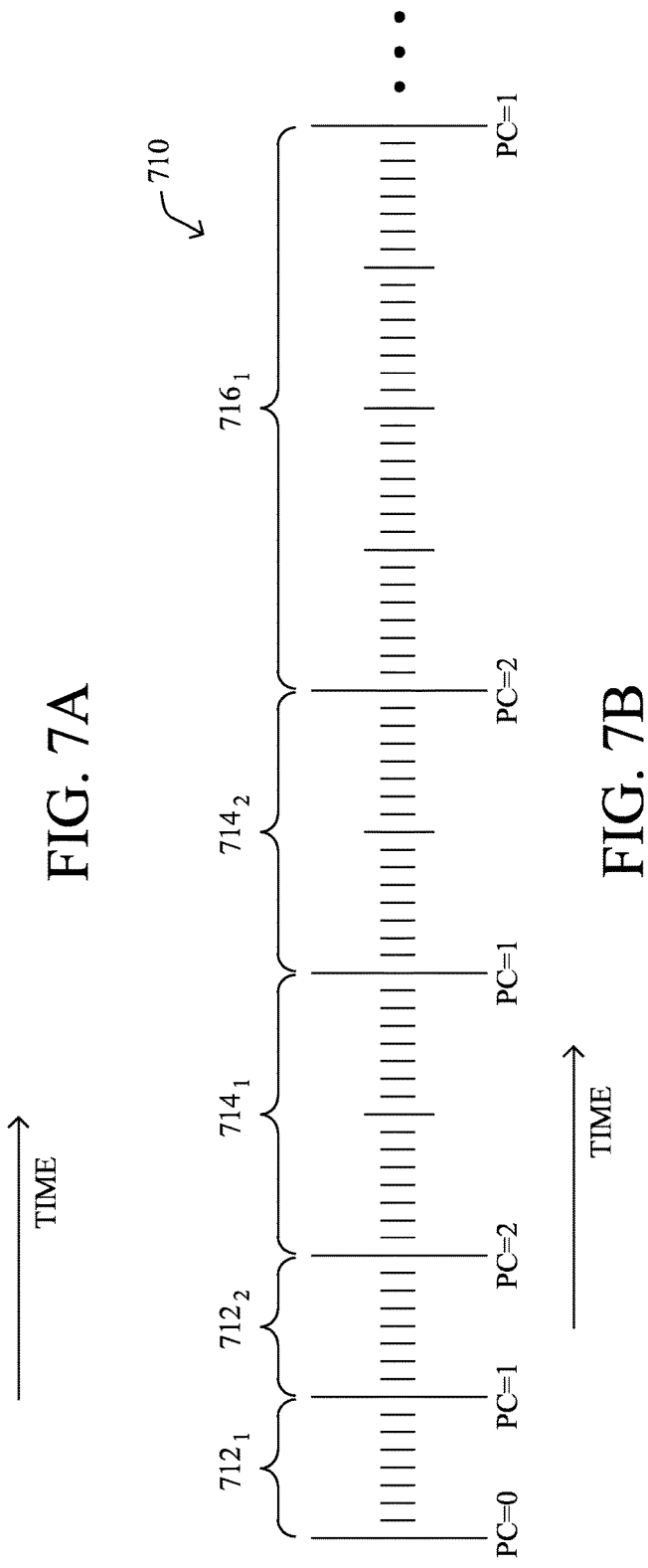
FIG. 7A
FIG. 7B

ASYNCHRONOUS BROADCAST COMMUNICATION BASED ON TIME-BASED EVENTS IN CHANNEL-HOPPING NETWORKS

TECHNICAL FIELD

The present disclosure relates generally to computer networks, and, more particularly, to asynchronous broadcast communication based on time-based events in channel-hopping networks.

BACKGROUND

Low-power and lossy networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. In many cases, LLN devices must communicate using a channel-hopping link layer that does not require any synchronization to communicate with neighboring devices. Link-layer broadcast communication is necessary since devices do not know the addresses of neighboring devices. Existing methods implement such broadcast communication by transmitting across all channels back-to-back. Such asynchronous broadcast transmission method effectively emulates communication across a single channel and the combination of transmissions across all channels appear as a single transmission to higher layers. However, these asynchronous broadcasts are expensive. For instance, the asynchronous broadcasts consume channel capacity on all channels. Moreover, they require the transmitter to transmit for long periods of time.

BRIEF DESCRIPTION OF THE DRAWINGS

The foregoing and other objects, features, aspects and advantages of the embodiments disclosed herein will become more apparent from the following detailed description when taken in conjunction with the following accompanying drawings.

FIG. 4 illustrates example independently determined and independently timed channel-hopping sequences.

FIGS. 7A and 7B illustrate example Trickle period timelines.

Figure 1:
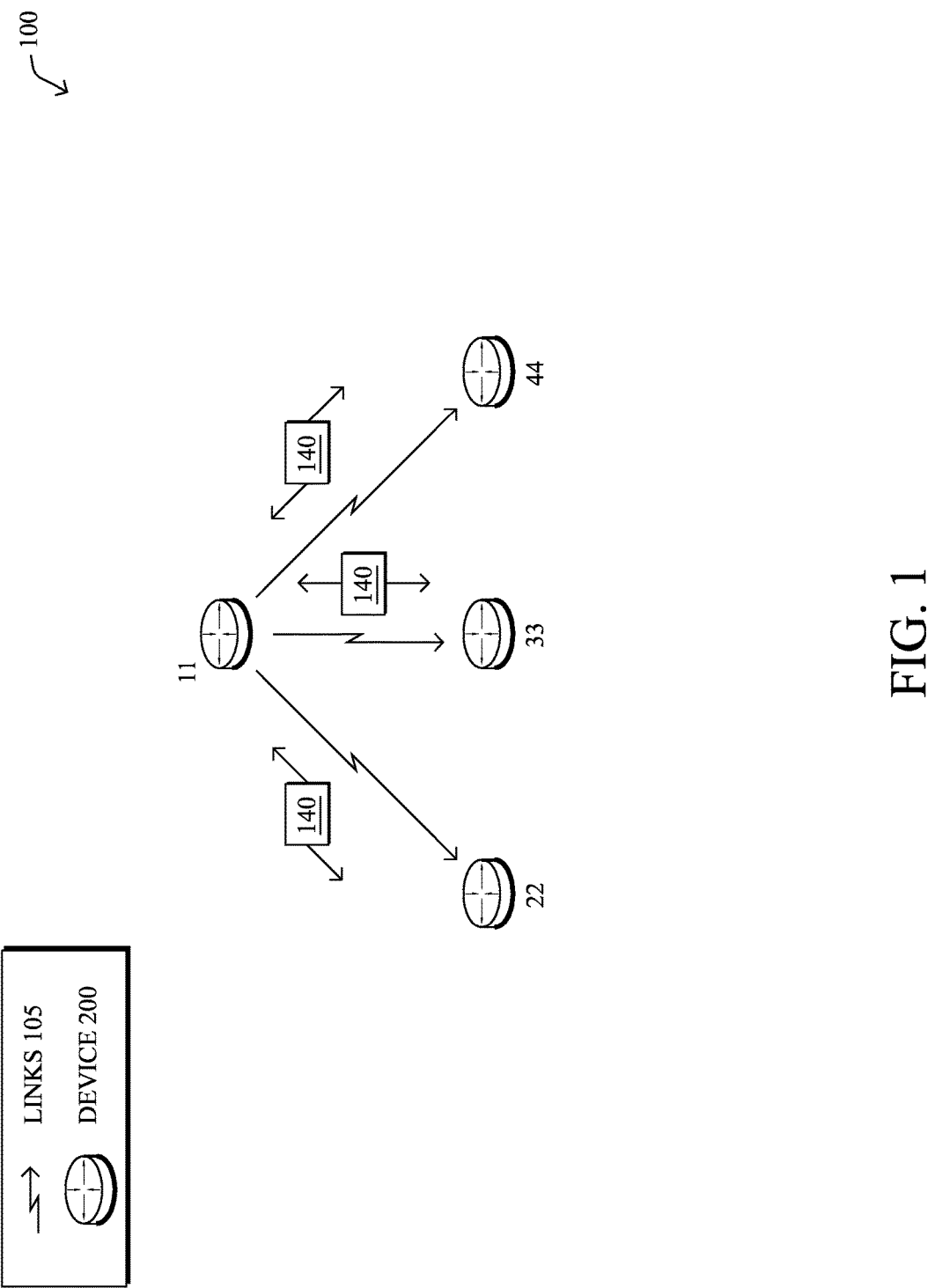
FIG. 1 illustrates an example communication network.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF EXAMPLE EMBODIMENTS

Overview

According to the disclosed embodiments, asynchronous broadcast communication is performed based on time-based events in channel-hopping networks. The embodiments include determining a plurality of channels in a channel-hopping network, on which a plurality of nodes communicate, and identifying an asynchronous broadcast message to transmit from a particular node. A plurality of time-based events is determined, and in response to each time-based event, the asynchronous broadcast message is transmitted on a single selected channel of the plurality of channels per time-based event.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communication links located in the same general physical location, such as a building or campus. WANs, on the other hand, typically connect geographically dispersed nodes over long-distance communication links, such as common carrier telephone lines, optical lightpaths, synchronous optical networks (SONET), synchronous digital hierarchy (SDH) links, or power-line communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100. Illustratively, computer network 100 comprises devices 200 (e.g., labeled as "11," "22," "33," and "44"), as described in FIG. 2 below, interconnected by communication links 105. For instance, the links 105 may be wired links or shared media (e.g., wireless links, PLC links, etc.) where certain devices 200, such as routers, sensors, computers, actuators, and the like, may be in communication with other nodes 200, based on distance, signal strength, current operational status, location, and the like. A network management server (NMS), which may serve as a "root" node in the illustrated computer network, may be in communication with the network 100. The "root" node may be of any suitable type for centralized network management, including an NMS, a field area router (FAR), and the like. For the purposes of the present disclosure, the computer network 100 may be of any suitable type of network, including, but limited to, an LLN. Further, the devices 200 may alternately be referred to as "nodes."

Those skilled in the art will understand that any number of nodes, devices, links, etc. may be used in a computer network, and that the view shown herein is for simplicity. Also, those skilled in the art will further understand that while the network is shown in a certain orientation, the network 100 is merely an example illustration that is not meant to limit the disclosure.

Data packets 140 (e.g., traffic and/or messages sent between the devices/nodes) may be exchanged among the devices 200 of the computer network 100 using predefined network communication protocols such as certain known wired protocols, wireless protocols (e.g., IEEE Std. 802.15.4, WiFi, Bluetooth®, etc.), LLN protocols, or other shared-media protocols where appropriate (e.g., PLC). As described herein, the communication may be based on a channel-hopping protocol. In this context, a protocol consists of a set of rules defining how the nodes interact with each other.

Figure 2:
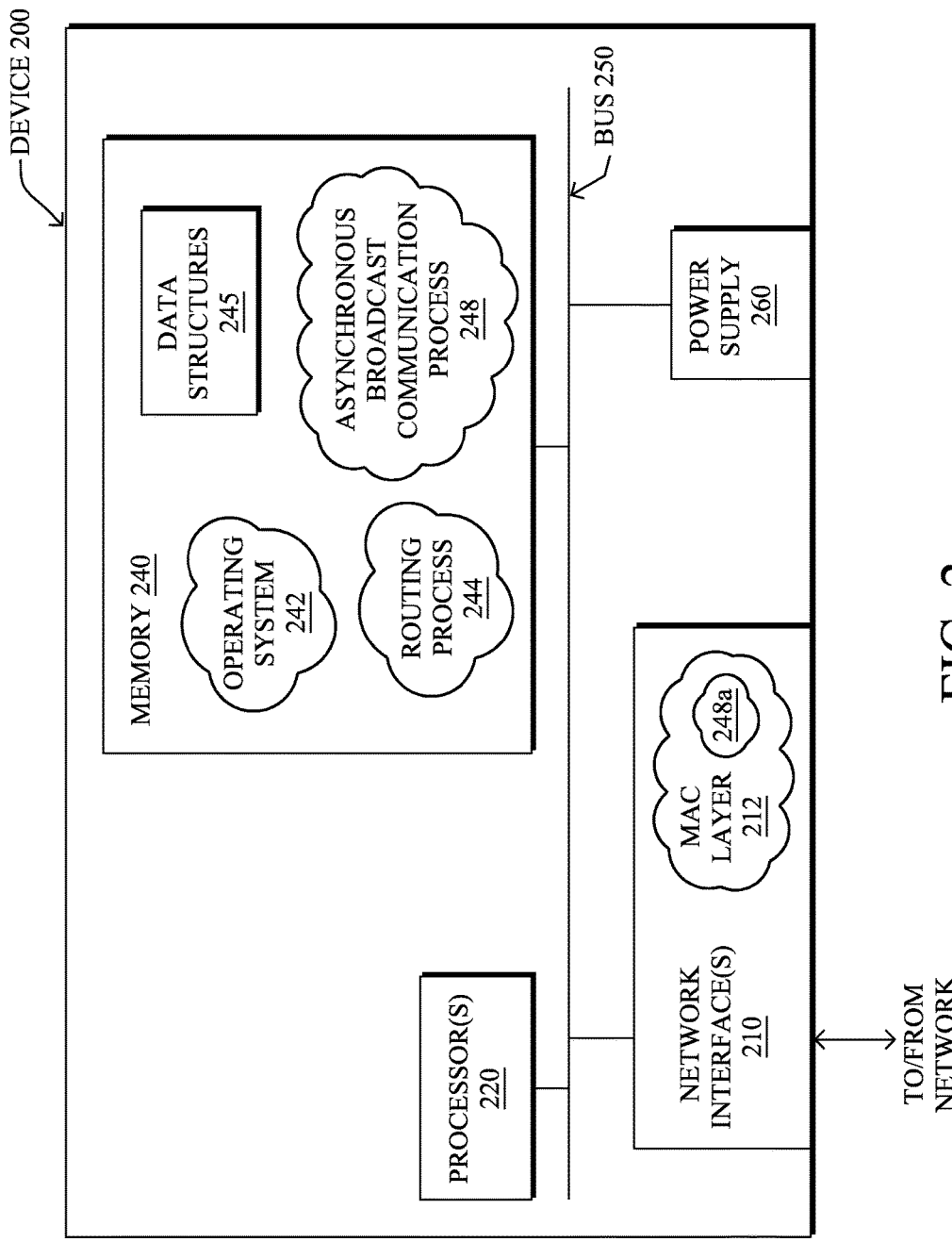
FIG. 2 illustrates an example network device/node.

FIG. 2 is a schematic block diagram of an example node/device 200 that may be used with one or more embodiments described herein, e.g., as shown in FIG. 1. The device may comprise one or more network interfaces 210 (e.g., wireless/channel-hopping), one or more processors 220, a memory 240, and a power supply 260 (e.g., plug-in, battery, etc.), interconnected by a system bus 250.

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for channel-hopping communication as described herein. The device 200 may have multiple different types of network interfaces 210, e.g., wireless and wired/physical connections, and that the view herein is merely for illustration. In addition, the interfaces 210 may comprise an illustrative media access control (MAC) layer module 212 (and other layers, such as the physical or "PHY" layer, as would be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor(s) 220 and the network interface(s) 210 for storing software programs and data structures associated with the embodiments described herein. Note that certain devices may have limited memory or no memory (e.g., no memory for storage other than for programs/processes operating on the device). The processor(s) 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "asynchronous broadcast communication" process 248, as described in greater detail below. Note that while the asynchronous broadcast communication process 248 is shown in centralized memory 240, alternative embodiments provide for the asynchronous broadcast communication process to be specifically operated within the network interface(s) 210, such as a component of MAC layer 212 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor(s) 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR).

Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, low-power and lossy networks (LLNs), e.g., certain sensor networks, may be used in a myriad of applications such as for "Smart Grid" and "Smart Cities." LLNs are comprised of anything from a few dozen and up to thousands or even millions of LLN routers, and support point-to-point traffic (e.g., between devices inside the LLN), point-to-multipoint traffic (e.g., from a central control point, such as the root node, to a subset of devices inside the LLN) and multipoint-to-point traffic (e.g., from devices inside the LLN towards a central control point).

Due to their underlying attributes, LLNs face a number of challenges. For example, LLNs are a class of network in which both the routers and their interconnect are "constrained." This means that LLN routers typically operate with constraints, e.g., processing power, memory, and/or energy (e.g., batteries). Also, their interconnects are characterized by, for example, high loss rates, low data rates, and/or instability.

Additionally, LLNs communicate over a physical medium that is strongly affected by environmental conditions that change over time. Some examples include temporal changes in interference (e.g., other wireless networks or electrical appliances), physical obstruction (e.g., doors opening/closing or seasonal changes in foliage density of trees), and propagation characteristics of the physical media (e.g., temperature or humidity changes). The time scales of such temporal changes can range between milliseconds (e.g., transmissions from other transceivers) to months (e.g., seasonal changes of outdoor environment).

Moreover, low-cost and low-power designs limit the capabilities of the transceiver. In particular, LLN transceivers typically provide low throughput and typically support limited link margin. Therefore, the effects of interference and environmental changes to LLNs are visible to link and network protocols.

In many cases, LLN devices must communicate using a channel-hopping link layer. This requirement is driven both by regulatory compliance and the fact that channel-hopping systems offer better spectral efficiency. Channel-hopping, also referred to as "frequency-hopping" or "frequency-hopping spread spectrum" (FHSS), is a method of transmitting radio signals by rapidly switching a carrier among numerous frequency channels, e.g., using a pseudorandom sequence known to both transmitter and receiver. Generally, as may be appreciated by those skilled in the art, transmission using channel-hopping is different from a fixed-channel transmission, in that channel-hopped transmissions are resistant to interference and are difficult to intercept. Accordingly, channel-hopping transmission is a useful technique for many applications, such as sensor networks, LLNs, military applications, etc.

Figure 3:
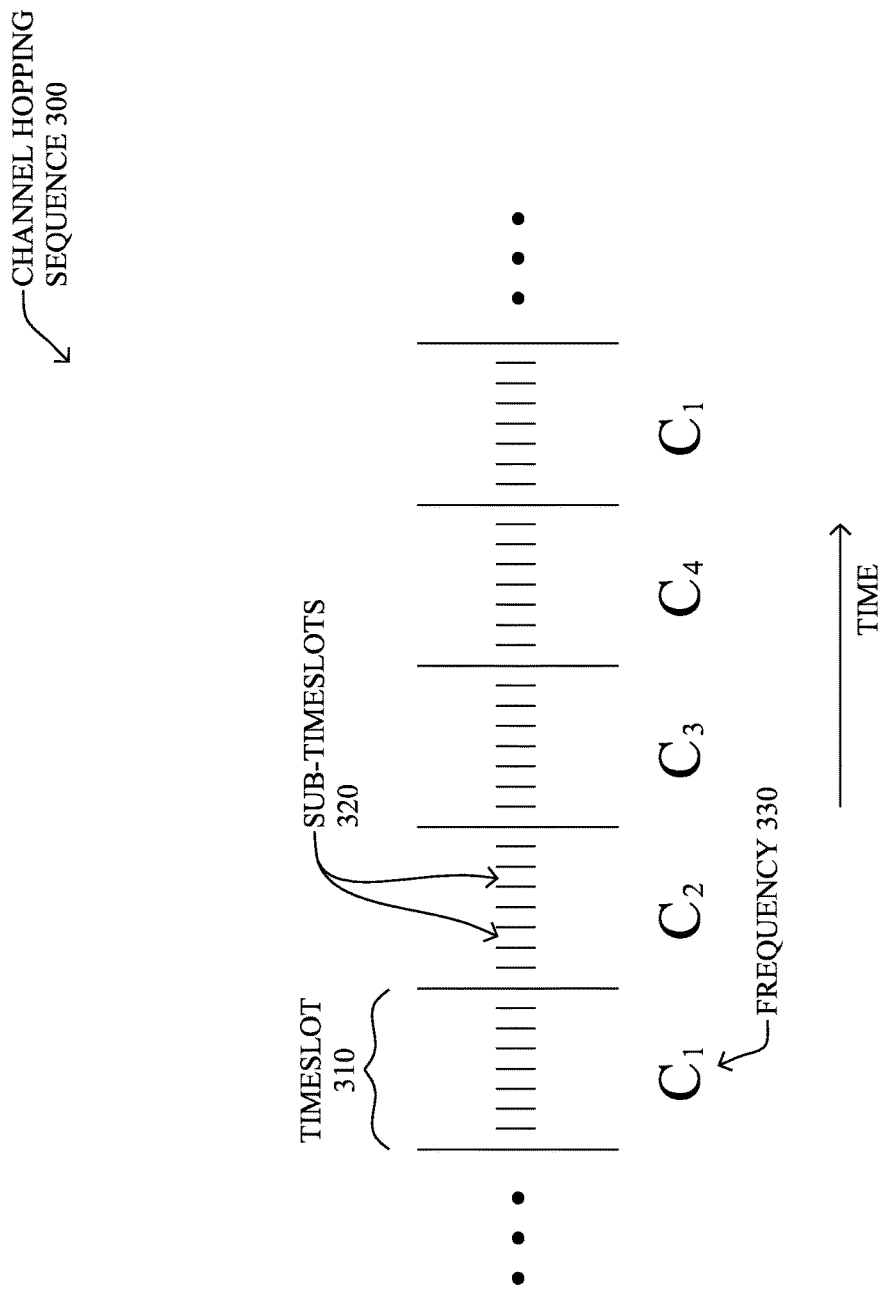
FIG. 3 illustrates an example channel-hopping sequence.

In general, as shown in FIG. 3, in channel-hopping networks, time frames are divided within a channel-hopping sequence 300 into regular timeslots 310, each one operating on a different channel 330 (e.g., c1-c4). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 310 may be further divided into sub-timeslots 320. (Note that not all channel-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

A device in the channel-hopping network configures its receiver to follow a hopping schedule by picking a channel sequence, duration of each time slot, and time base that defines when the first slot in the schedule begins. To then communicate a packet, a transmitting device and the receiver must be configured to the same channel during the packet transmission. All devices in a given network may utilize the same hopping schedule (i.e., all devices are configured to use the same channel sequence, time slot duration, and a common time base), resulting in a network where all communication in the network at any given point in time utilizes the same channel. Alternatively, each transmitter-receiver pair may utilize different hopping schedules (i.e., each pair may differ in channel sequence, time slot duration, and/or time base), such that transmitter-receiver pairs may communicate at the same time but on different channels. Moreover, timeslots between different devices can, in fact, be out-of-phase, and may have no relationship with each other.

FIG. 4 illustrates an example of independently determined local unicast listening schedules 400 that may be computed by each individual device, "11," "22," "33," and "44," respectively. A device synchronizes its listening, or "hopping," schedule with another device by communicating its channel sequence, time slot duration, and current time within the schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

However, it is possible that devices may not know the addresses of neighboring devices. Therefore, link-layer broadcast communication may be necessary, as it does not require any synchronization to communicate with neighboring devices. For example, IEEE 802.15.4 Enhanced Beacon Requests (EBRs) and Enhanced Beacons (EBs) are used by devices to discover neighboring networks. This type of broadcast communication is considered "asynchronous," since the network devices are not synchronized to a common channel schedule.

As noted above, networking methods may implement the broadcast communication by transmitting across all channels back-to-back. This asynchronous broadcast transmission method effectively emulates communication across a single channel, and the combination of transmissions across all channels appear as a single transmission to higher layers. However, the asynchronous broadcasts are expensive. For instance, the asynchronous broadcasts consume channel capacity on all channels. Moreover, they require the transmitter to transmit for long periods of time.

Because asynchronous broadcasts are expensive, existing networking methods may operate more efficiently by applying an algorithm, such as the "Trickle" algorithm, to manage and reduce the number of transmissions. The Trickle algorithm, as described in further detail below, is effective in reducing the number of transmissions, especially since the information contained in EBs and EBRs is relatively static. However, even when applying Trickle methodologies, existing networking methods still suffer from at least the following drawbacks:

1) Transmitting on all channels back-to-back occupies the transceiver for a significant period of time. In this regard, a single asynchronous broadcast can require 500 ms of transmission time. This increases queuing latency for other packets queued in the device and latency for neighboring devices to communicate packets to it.

2) While the Trickle algorithm effectively spreads the cost of transmissions across nodes over time, each asynchronous broadcast is still a significant energy burden. This can cause issues with devices that have limited energy supplies (e.g., capacitor-based power supplies). This may also cause issues when regulatory constraints have strict limits on transmission time.

3) By having asynchronous transmissions emulate a single broadcast transmission, the Trickle algorithm does not take full advantage of the spatial diversity. Having a single node transmit across all channels effectively suppresses all neighboring nodes' transmissions.

4) Transmitting on all channels back-to-back tightly correlates the channel occupancy in time. In other words, asynchronous broadcasts generate internal interference across all channels within a small time range.

Trickle for Asynchronous Broadcast Communication

The techniques herein address the aforementioned drawbacks by improving the performance of Trickle-based asynchronous broadcasts in a channel-hopping network, such as an LLN. The disclosed embodiments improve performance by eliminating the need to transmit packets back-to-back across all channels, thereby removing the abstraction that an asynchronous broadcast is effectively a broadcast in a single-channel network.

In particular, the techniques herein apply Trickle-based dissemination to channel-hopping LLNs. Rather than having each Trickle event cause a link-layer transmission on all channels back-to-back, as referenced above, each event only causes a single link-layer transmission on a given channel. Importantly, reaching a random subset of neighbors—rather than attempting to reach all by transmitting on every channel back-to-back—is perfectly fine when using Trickle-based dissemination, largely due to the reception redundancy that is inherent in Trickle-based dissemination. The present disclosure describes two exemplary embodiments of applying Trickle: i) having a separate Trickle timer for each channel, and ii) using a single Trickle timer. Notably, the Trickle algorithm, as described in detail in Request for Comment (RFC) 6206, is modified to accommodate the channel-hopping scenario described herein. Of course, as would be understood by one of ordinary skill in the art, the above exemplary embodiments may be modified in any suitable manner within the spirit of the claims.

Specifically, according to the disclosed embodiments, asynchronous broadcast communication is performed based on time-based events in channel-hopping networks. The embodiments include determining a plurality of channels in a channel-hopping network, on which a plurality of nodes communicate, and identifying an asynchronous broadcast message to transmit from a particular node. A plurality of time-based events is determined, and in response to each time-based event, the asynchronous broadcast message is transmitted on a single selected channel of the plurality of channels per time-based event.

Illustratively, the techniques described herein may be performed by hardware, software, and/or firmware, such as in accordance with the asynchronous broadcast communication process 248, which may contain computer executable instructions executed by the processor(s) 220 (or an independent processor of network interface(s) 210) to perform functions relating to the techniques described herein, e.g., in conjunction with routing process 244, as depicted in FIG. 2. The techniques described herein may be processed by similar components that are understood in the art to be operable to perform asynchronous broadcast communication.

Operationally, the techniques herein generally relate to, but are not limited to, applying Trickle to channel-hopping LLNs. For example, a device of the network 100 may maintain a separate Trickle timer for every channel respectively. In this regard, a single reception event may affect the timers of all channels in accordance with the Trickle algorithm, not just the channel in which the communication was transmitted. Alternatively, a device of the network 100 may maintain a single shared Trickle timer for all channels. In this regard, a Trickle period count may be maintained and incremented upon expiration of a period, and the duration of the period may be increased when the period count exceeds a predetermined threshold.

Figure 5A:
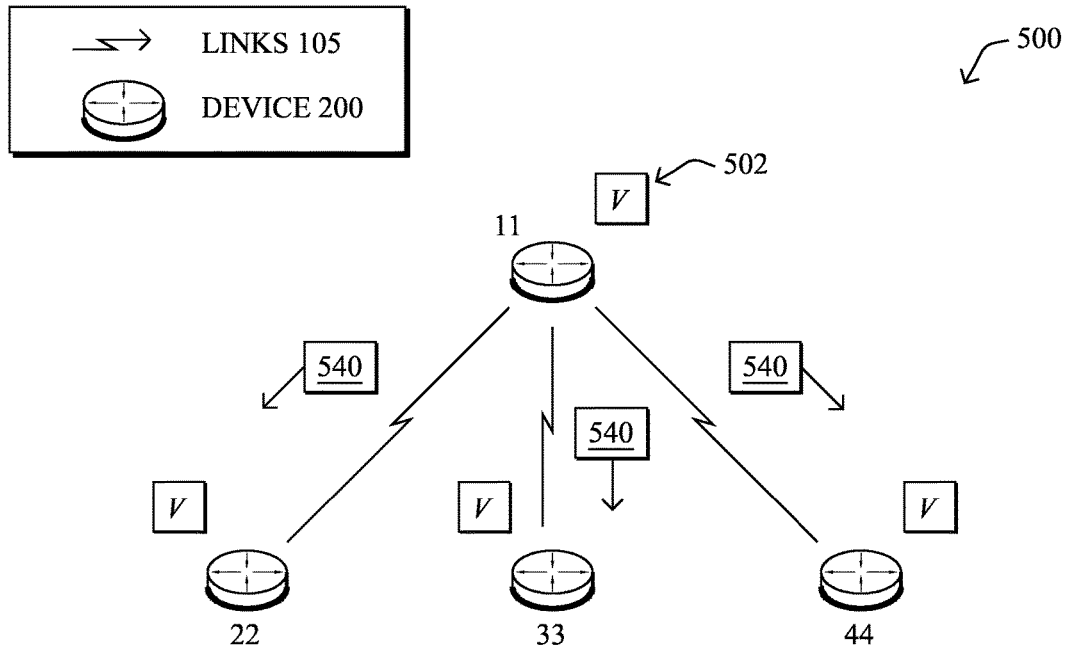
FIGS. 5A and 5B illustrate example network configuration sequences.
Figure 5B:
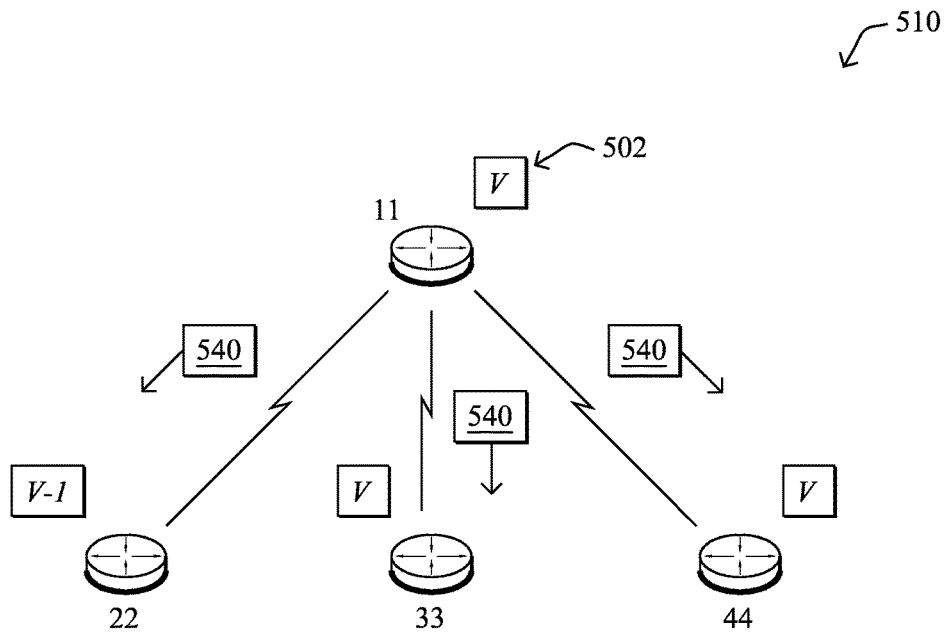

FIGS. 5A and 5B illustrate example network configuration sequences. In particular, FIGS. 5A and 5B serve to illustrate the key concept of redundancy within the ambit of a "redundancy-based transmission frequency reduction" algorithm, such as Trickle. More specifically, FIGS. 5A and 5B illustrate example network configuration sequences, whereby the currency of the software versions of the network devices is verified. It should be understood however, that software version verification is only one example of several possible network applications to be utilized in Trickle-based asynchronous broadcast communications in channel-hopping networks. Other applications of Trickle-based asynchronous broadcast communications in channel-hopping networks may include, for example, detecting a routing state, determining the last heard broadcast/multicast packet, discovering neighboring devices and/or networks, EBRs/EBs, etc.

The fundamental premise of Trickle is that a device periodically transmits data to other devices unless it hears other transmissions whose data suggest its own transmission is redundant. The Trickle algorithm is known in the art, and the parameters, variables, and process steps thereof are discussed in further detail in RFC 6206. Notably, it should be understood that the disclosed embodiments may be compatible with, and applicable to, any similar redundancy-based transmission frequency reduction algorithm.

According to Trickle, there are two possible outcomes to data transmission(s) from a given device: 1) every receiving device (i.e., recipients) that hears the message finds that the message data is "consistent" with its own state (e.g., the data is redundant); or 2) any one recipient detects that the message data is "inconsistent" with its own state (e.g., the data is not redundant). Detection can be the result of either an out-of-date device hearing something new, or an updated device hearing something old. With respect to software updates, for example, as long as every device communicates somehow, i.e., either receives or transmits data, some device will detect the need for an update.

As shown in FIG. 5A, the computer network 500 comprises devices 200, e.g., "11," "22," "33," and "44," which are interconnected via communication links 105. As an illustration of "consistent" data transmission as noted above, the devices 200 are illustratively associated with a respective software version 502. In FIG. 5A, all devices 200 have the same software version "V," which represents an up-to-date software version. The messages 540, such as data packets 140, may be exchanged among the devices 200 of the computer network 100 using predefined network communication protocols, as described above and depicted in FIG. 1. The messages 540 contain an indication of the software version corresponding to the transmitting device. In the illustrated example, the device "11" transmits messages 540 to devices "22," "33," and "44" respectively, in which an indication of the software version of device "11" is contained. Because each of devices "22," "33," and "44" have the same software version, i.e., "V," as the transmitting device "11," the receiving devices, i.e., "recipients," recognize that the transmission is "consistent," or in other words, a redundant transmission. Therefore, no software update would be necessary in this case.

On the other hand, in FIG. 5B, the computer network 510 comprises devices 200 which all have the same software version "V," except for device "22" which has a software version "V−1." It should be understood that the software version "V−1" may represent an out-of-date software version. However, the same principle applies if the software version of the differing device was "V+1," or any other dissimilar version. Just as in FIG. 5A, the device "11" transmits messages 540 to devices "22," "33," and "44" respectively, in which an indication of the software version of device "11" is contained. Because each of devices "33" and "44" have the same software version, i.e., "V," as the transmitting device "11," these recipients do not detect any "inconsistency," and thus, the data appears to be redundant from their perspective. However, because device "22" has an out-of-date software version, i.e., "V−1," compared to the transmitting device "11," this recipient detects an inconsistency. Therefore, a software update would be necessary in this case.

Notably, in FIG. 5B, the inconsistency between devices "11" and "22" would have been detected even if the message 540 was instead transmitted from "22" to "11." This is because according to the Trickle algorithm, it does not matter who first transmits the message—"11" or "22"—the inconsistency will be detected in either case. Further, for the purposes of simplification, the message 540 sent by device "11" was received by every other device. However, in a channel-hopping network, it is unlikely that every receiving device will be "listening" on the channel on which a given message is sent. Therefore, in order for devices "22," "33," and "44" to each receive the transmission of device "11," the recipients would have to be listening on the appropriate channel.

Figure 6:
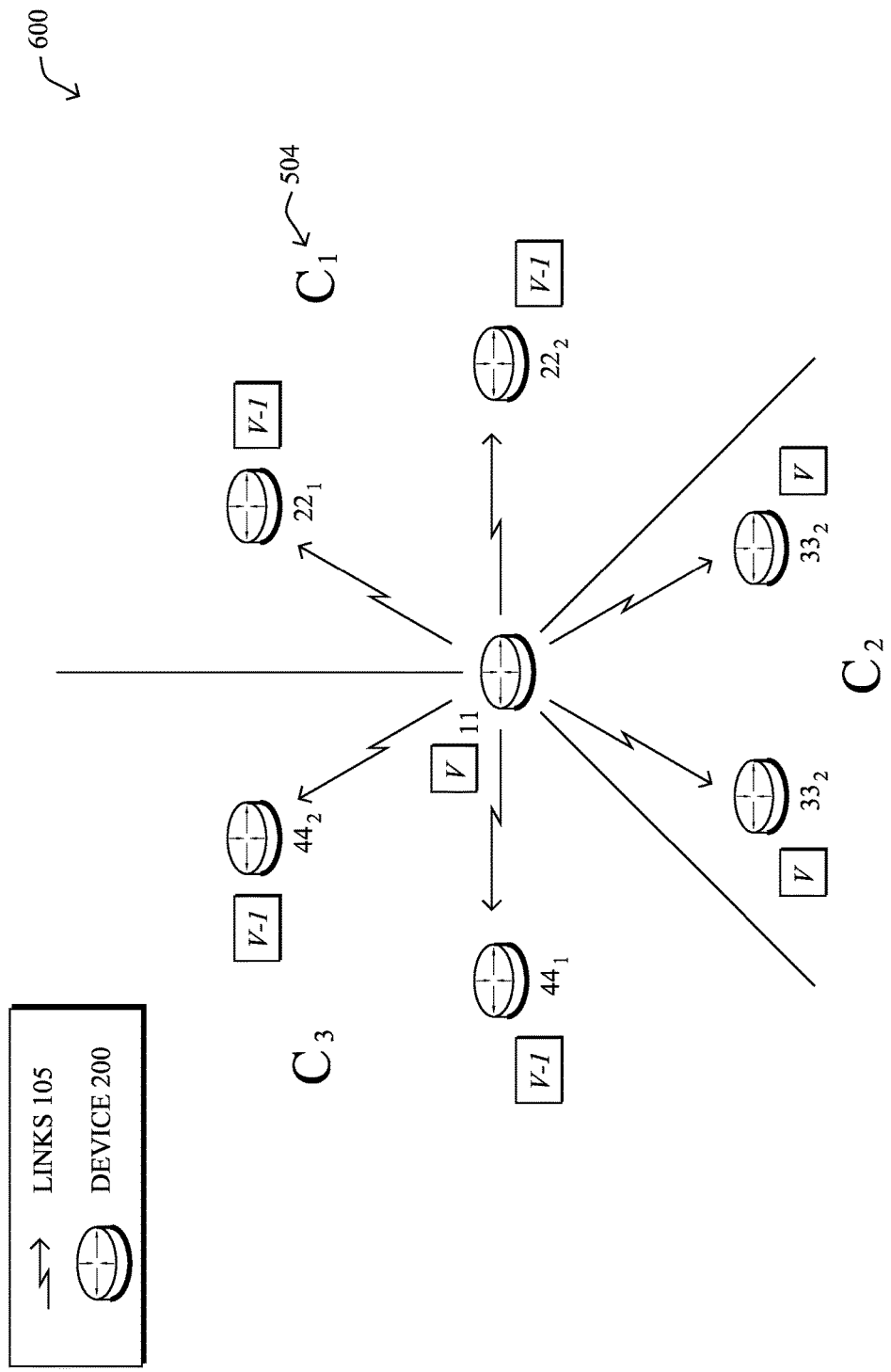
FIG. 6 illustrates an example network containing separate Trickle timers for each channel.

FIG. 6 illustrates an example network containing separate Trickle timers for each channel. As shown in FIG. 6, the computer network 600 comprises devices 200, e.g., "11," "$22_1$," "$22_2$," . . . "$44_2$," which are interconnected via communication links 105. Using the example illustrated in FIGS. 5A and 5B, the devices 200 are associated with a respective software version 502. As explained above, software version verification is but one example of several possible network applications to be utilized in Trickle-based asynchronous broadcast communications in channel-hopping networks. The device "11" is configured to transmit data, such as the message 540 in FIGS. 5A and 5B, to the other devices to verify their respective software versions. The devices "11," "$22_1$," "$33_1$," and "$33_2$," have a software version "V," whereas devices "$22_2$," "$44_1$," and "$44_2$," have a software version "V−1." The software version "V" may represent an up-to-date version, while "V−1" may represent an out-of-date version. However, the software versions may be assigned to the devices 200 in any particular manner, including the root node having the out-of-date version, and the Trickle algorithm will function in the same manner.

The devices 200 are operating on different channels 504 (e.g., c1-c3). Put another way, the devices are "listening" for transmissions occurring on their respective channel. Therefore, if, for example, device "11" transmits a message on channel c1, only devices "$11_1$," and "$11_2$," which are operating on that channel, will "hear," i.e., receive, the transmission. In a typical channel-hopping network, the recipients of any given data transmission on a given channel will generally be a random subset of network devices. In other words, the transmission will generally be missed by a number of devices due to operating a different channel. Existing networking methods attempt to compensate for this fact by transmitting the data across all channels back-to-back, such that the data is received by every network device regardless of their operating channel. Such methods suffer from a number of performance-related drawbacks, including occupying the transceiver for a significant period of time, excessive energy consumption, correlating internal interference on all channels within a small time frame, and failing to take full advantage of spatial diversity.

When using Trickle-based dissemination techniques however, reaching a random subset of neighbors is perfectly acceptable. This is due to the Trickle algorithm taking advantage of redundant data transmissions/receptions. For example, a simple model demonstrates the differences between sending across all channels back-to-back and sending on a single channel randomly according to Trickle. When sending across all channels back-to-back, each asynchronous broadcast involves C transmissions, i.e., the number of channels. For simplicity, it may be assumed that all neighboring devices will receive the asynchronous broadcast. Due to the hidden terminal problem, the number of transmissions within a given area, i.e., the number of packets received by a given device, is typically more than the Trickle suppression threshold (described in further detail in RFC 6206). The number of redundant receptions, R, per Trickle period grows logarithmically with the density of the network. Taking into account transmission on each channel, a given region has about R*C transmissions. Results have shown that with a redundancy threshold of 1, for example, i.e., Trickle parameter k=1, R=4 in moderately dense deployment scenarios.

In contrast, when sending data on a single random channel, the probability for a given neighboring node to receive the message is 1/C. In an ideal radio model, the probability for a given neighboring node to receiving the message after C transmissions is $1-(1-1/C)^C$. For reasonable values of C, e.g., C=64 when using IEEE 802.15.4g, this probability is around 63%. However, taking into account the reception redundancy inherent in multi-hop deployments, the probability for a given node to receive the message is $1-(1-1/C)^{(R*C)}$. Assuming C=64 and R=4, the probability for a given neighboring node receiving the message after C transmissions is higher than 98%.

As a result, for the same number of transmissions, the reliability of delivering the message to each device is relatively high under Trickle-based dissemination techniques. Notably, even sending on all channels back-to-back in the ideal channel model does not result in 100% reliability, since the receiver may miss the transmission if it is in the middle of a channel switch operation, for example.

In a typical network, such as network 600, as long as every device communicates somehow, e.g., either receives or transmits the data at-issue, some device will detect an inconsistency, if one in fact exists. In the case of software updates, the need for a software update may be detected by a device with an out-of-date software version, e.g., "V−1." In response, a device, such as an NMS, a FAR, or any other device, may broadcast or multicast software updates, such that all of its neighbors can receive them without even having to advertise their need.

In the example illustrated in FIG. 6, device "11" may first transmit data containing an indication of its software version, such as the message 540, on channel c1. The recipients of the data transmission include only those devices listening for transmission on channel c1, e.g., devices "$22_1$," and "$22_2$." Because the message received by device "$22_2$" represents a system state different than its own, i.e., device "$22_2$" is running an out-of-date software version in "V−1," the receiving device recognizes an inconsistency. Similarly, when device "11" transmits the data on channel c3, because both devices "$44_1$," and "$44_2$," are running differing, e.g., out-of-date, software versions, those receiving devices recognize an inconsistency. In contrast, when device "11" transmits the data on channel c2, because the devices "$33_1$" and "$33_2$" are running the same software version, e.g., "V," as the version indicated in the transmitted data, those receiving devices recognize a consistent, i.e., redundant, reception. The differences between consistent and inconsistent receptions are described in further detail above.

According to an exemplary embodiment, the device "11," or any other network device, maintains a separate Trickle timer for each channel, e.g., c1-c3. Similarly, separate Trickle-based variables and parameters, e.g., redundancy count, period duration, etc., are maintained for each channel. When the Trickle algorithm starts its execution in a particular channel, the corresponding redundancy count is set to zero, and the initial period begins, i.e., the timer begins to run. When the period expires, i.e., when the timer runs for the entirety of the period's duration, the redundancy count is reset to zero, the duration of the period is doubled, and a new period begins, i.e., the timer is reset to zero. When the timer fires, the device, e.g., "11," transmits data on the corresponding channel, provided that the redundancy count of that channel is less than a predetermined threshold value. For the purposes of the present disclosure, the firing of the timer may be considered a "time-based event." Alternatively, the "time-based event" may include other suitable events, such as external events, depending on how the particular protocol uses Trickle. Moreover, the above-referenced period may be considered a "period of time-based events."

Importantly, when a "consistent" message is received on the particular channel, the redundancy count is incremented for all channels respectively, rather than merely incrementing the redundancy count for the particular channel alone. Similarly, when an "inconsistent" message is received on the particular channel, the Trickle timers for all channels are reset. In other words, the redundancy counts for all channels respectively are reset to zero, the timers for all channels respectively are reset to zero, and the duration of the periods for all channels respectively is reset to the initial period duration. Accordingly, the Trickle algorithm may be efficiently adapted to channel-hopping networks since the reception events in a particular channel, i.e., either consistent or inconsistent, affect the Trickle timers for all channels, rather than merely the channel in which reception event occurred.

FIGS. 7A and 7B illustrate example Trickle period timelines. FIG. 7A depicts a typical Trickle timeline, such as that utilized in the above-referenced exemplary embodiment. The Trickle timeline 700 comprises periods 702, 704, and 706. The periods progress in accordance with time. Therefore, the timeline depicts a typical Trickle progression, whereby once each period expires, the duration of the period doubles, and a new period begins, i.e., the timer is reset to zero.

Conversely, FIG. 7B depicts another exemplary embodiment, whereby a period count is maintained, and the duration of a period does not increase unless the period count exceeds a predetermined threshold. In contrast to the above-referenced embodiment, the device "11," or any other network device, maintains a single shared Trickle timer for all channels. Similarly, a single shared set of Trickle-based variables and parameters, e.g., redundancy count, period duration, etc., is maintained for all channels. For the purposes of the present disclosure, the firings of the timer which are shared by all channels may be considered a "shared set of time-based events."

The Trickle timeline 710 includes periods $712_1$, $712_2$, $714_1$, $714_2$, and $716_1$. Similar to the above, the periods progress in accordance with time. The period count 718 records the number of consecutive periods of the same duration. Upon execution of the Trickle algorithm, the period count may be initiated to zero. After the first period, i.e., "$712_1$," expires, the period count is incremented to a value of one. Along the same lines, after the second period, i.e., "$712_2$," expires, the period count is incremented to a value of two, since it is the second consecutive period with the same duration.

According to the embodiment, when a period expires, i.e., when the timer runs for the entirety of the period's duration, the redundancy count is reset to zero, and the period count is incremented. Importantly, if the period count, which is first incremented due to the period expiring, exceeds a predetermined threshold, the duration of the period is doubled, and a new period begins, i.e., the timer is reset to zero. Otherwise, a new period begins without any change to the duration of the period. In FIG. 7B, the period count threshold is equal to one. Therefore, the period count threshold effectively requires two or more consecutive periods with the same duration before the duration may be doubled. Of course, any suitable period count may be chosen.

When the timer fires, the device transmits data on a randomly selected channel, provided that the redundancy count of that channel is less than a predetermined threshold value. In addition, when a "consistent" message is received on any channel, the redundancy count is incremented. Conversely, when an "inconsistent" message is received on any channel, the redundancy count is reset to zero, the period is reset to the initial period duration, and a new period is started, i.e., the timer is reset to zero.

Figure 8:
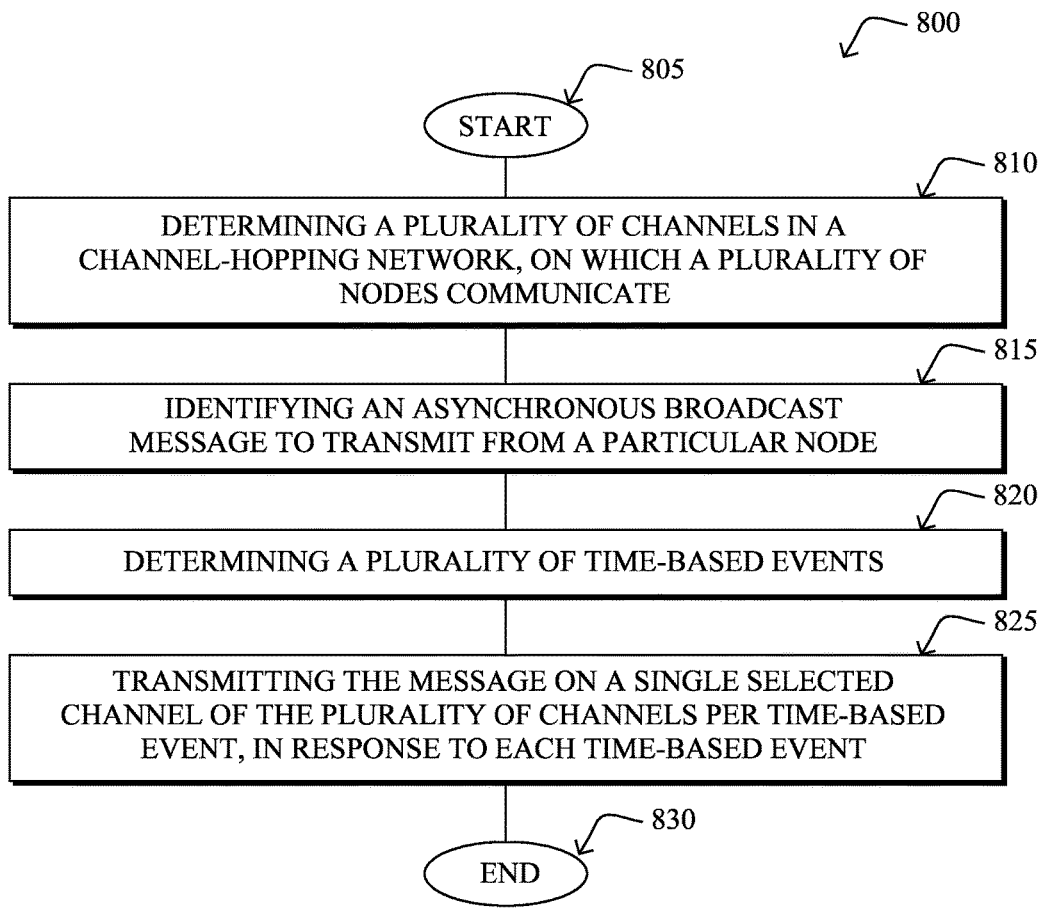
FIGS. 8-10 illustrate example simplified procedures for asynchronous broadcast communication based on time-based events in channel-hopping networks.
Figure 9:
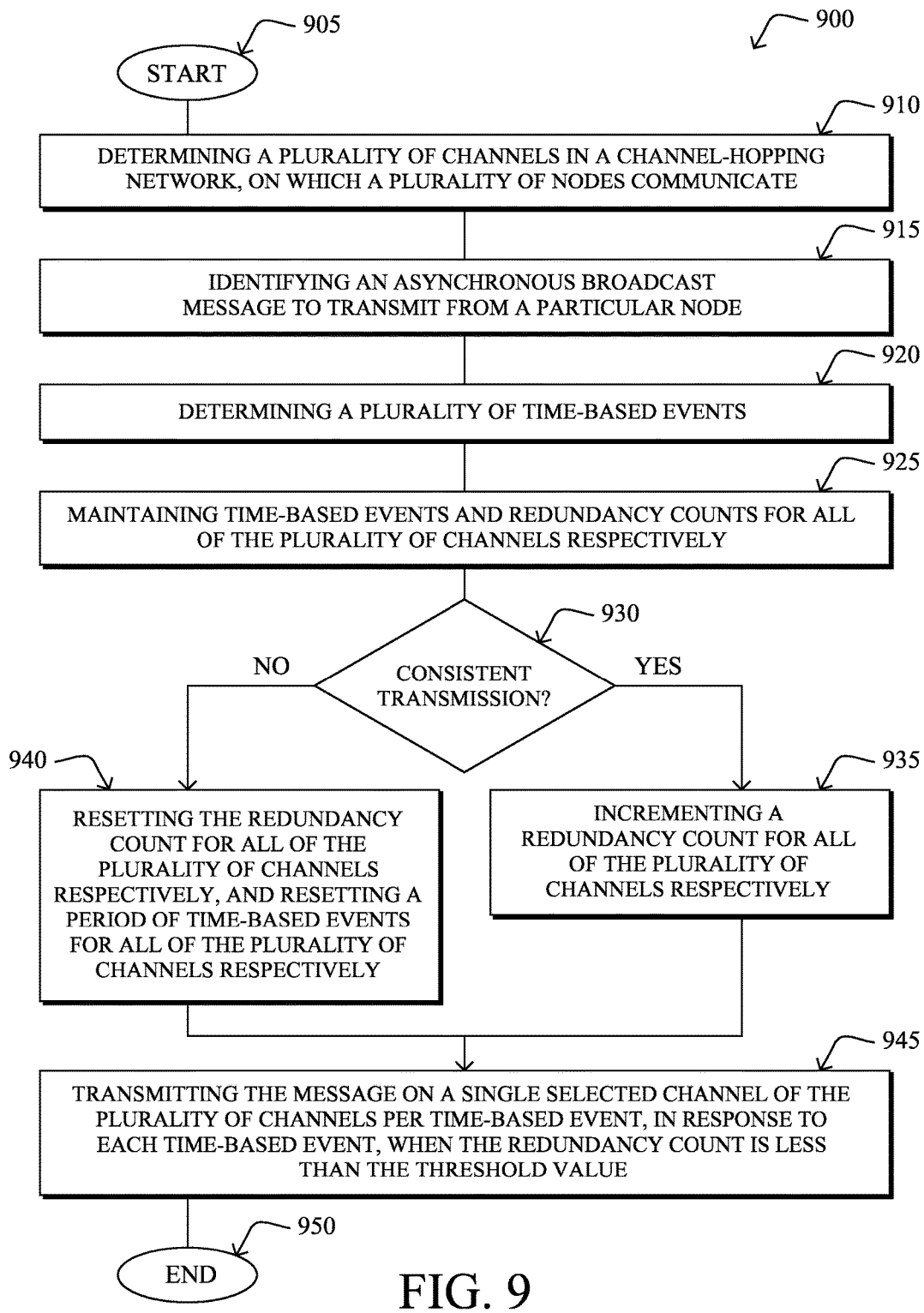
Figure 10:
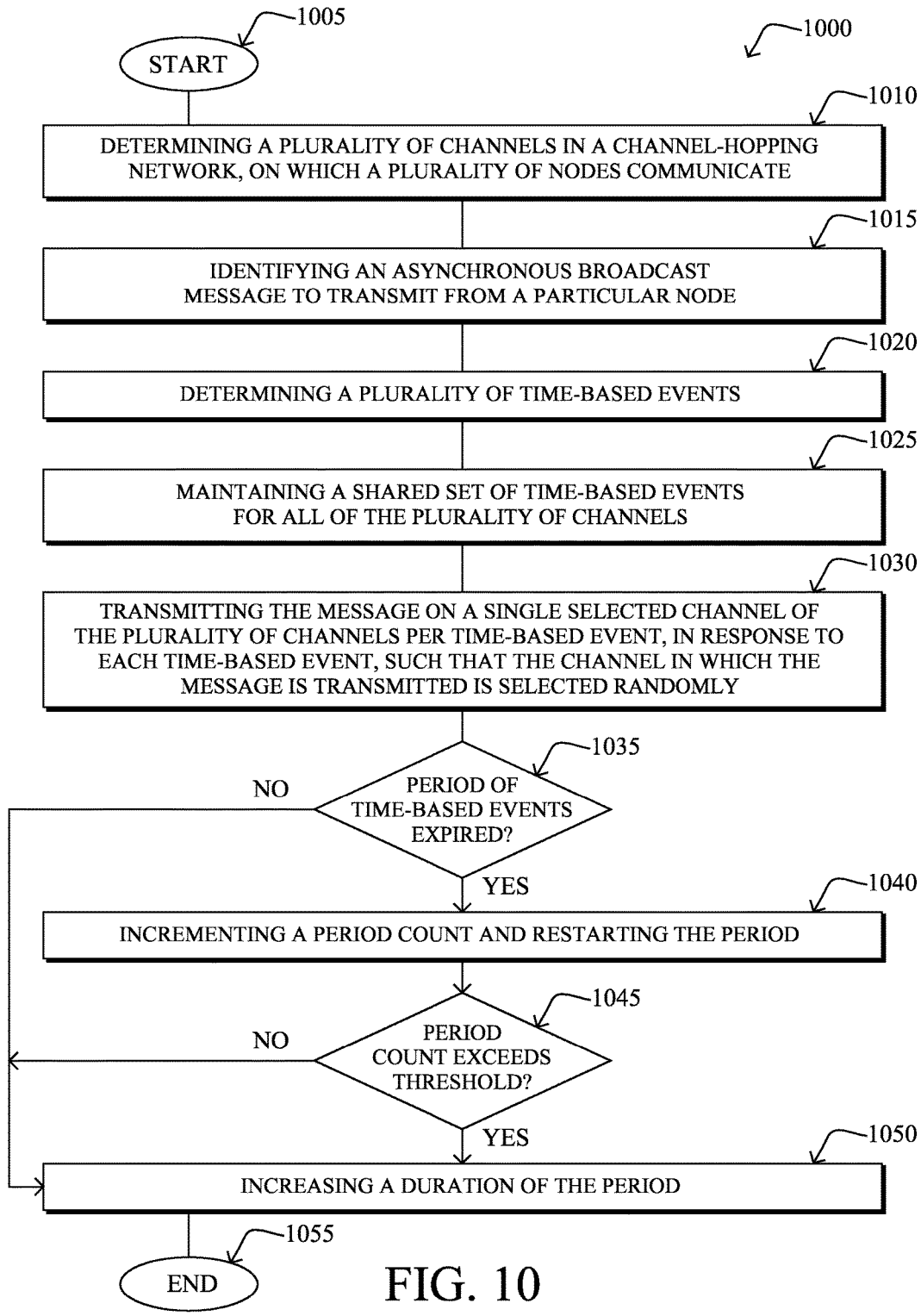

FIGS. 8-10 illustrate example simplified procedures for asynchronous broadcast communication based on time-based events in channel-hopping networks. As shown in FIG. 8, the procedure 800 may start at step 805, continue to step 810, and so forth, where, as described in greater detail above, asynchronous broadcast communication is performed based on time-based events in channel-hopping networks. Although FIG. 8 depicts steps in a particular order, it should be understood that the depicted embodiment is not limiting, and the particular order is depicted merely for illustration purposes.

At Step 810, the procedure 800 includes determining a plurality of channels in a channel-hopping network, on which a plurality of nodes communicate. In many cases, LLN devices must communicate using a channel-hopping link layer. This requirement is often driven by regulatory compliance, as well as the fact that channel-hopping systems offer better spectral efficiency.

At Step 815, the procedure 800 further includes identifying an asynchronous broadcast message to transmit from a particular node. It is often necessary to have a link-layer broadcast mechanism that does not require any synchronization, i.e., asynchronous, to communicate with neighboring devices. For example, IEEE 802.15.4 Enhanced Beacon Requests (EBRs) and Enhanced Beacons (EBs) are used by devices to discover neighboring networks. Link-layer broadcast communication is necessary since devices do not know the addresses of neighboring devices.

At Step 820, the procedure 800 further includes determining a plurality of time-based events. For the purposes of the present disclosure, the firing of the timer may be considered a "time-based event." The Trickle algorithm operates according to the time-based events. For instance, when Trickle starts its execution in a particular channel, the corresponding redundancy count is set to zero, and the initial period begins, i.e., the timer begins to run. When the period expires, i.e., when the timer runs for the entirety of the period's duration, the redundancy count is reset to zero, the duration of the period is doubled, and a new period begins, i.e., the timer is reset to zero.

At Step 825, the procedure 800 further includes transmitting the message on a single selected channel of the plurality of channels per time-based event, in response to each time-based event. When a time-based event occurs, e.g., when the timer fires, the particular device transmits data on the corresponding channel, provided that the redundancy count of that channel is less than a predetermined threshold value. Importantly, the present disclosure improves overall performance by eliminating the need to transmit packets back-to-back across all channels. In other words, the present disclosure removes the abstraction that an asynchronous broadcast is effectively a broadcast in a single-channel network.

As shown in FIG. 9, the procedure 900 may start at step 905, continue to step 910, and so forth, where, as described in greater detail above, asynchronous broadcast communication is performed based on time-based events in channel-hopping networks. Although FIG. 9 depicts steps in a particular order, it should be understood that the depicted embodiment is not limiting, and the particular order is depicted merely for illustration purposes.

At Step 910, the procedure 900 includes determining a plurality of channels in a channel-hopping network, on which a plurality of nodes communicate. As described above, many LLN devices must communicate using a channel-hopping link layer. This requirement is often driven by regulatory compliance, as well as the fact that channel-hopping systems offer better spectral efficiency.

At Step 915, the procedure 900 further includes identifying an asynchronous broadcast message to transmit from a particular node. As described above, it is often necessary to have a link-layer broadcast mechanism that does not require any synchronization, i.e., asynchronous, to communicate with neighboring devices. For example, IEEE 802.15.4 EBRs and EBs are used by devices to discover neighboring networks. Link-layer broadcast communication is necessary since devices do not know the addresses of neighboring devices.

At Step 920, the procedure 900 further includes determining a plurality of time-based events. As described above, for the purposes of the present disclosure, the firing of the timer may be considered a "time-based event." The Trickle algorithm operates according to the time-based events. For instance, when Trickle starts its execution in a particular channel, the corresponding redundancy count is set to zero, and the initial period begins, i.e., the timer begins to run. When the period expires, i.e., when the timer runs for the entirety of the period's duration, the redundancy count is reset to zero, the duration of the period is doubled, and a new period begins, i.e., the timer is reset to zero.

At Step 925, the procedure 900 further includes maintaining time-based events and redundancy counts for all of the plurality of channels respectively. Therefore, a given node maintains a separate Trickle timer and transmission redundancy counts for each channel, rather than the node maintaining a single shared Trickle timer and transmission redundancy count for all channels.

At Step 930, the procedure 900 further includes determining whether a consistent transmission was detected in any channel. A transmission is deemed consistent when every receiving device (i.e., recipients) that hears the message in a particular finds that the message data is consistent with its own state (e.g., the data is redundant). The concept of consistency is illustrated in FIG. 5A and described further above. If a consistent transmission is detected, the procedure 900 proceeds to Step 935. However, if a consistent transmission is not detected, or in other words, if an inconsistent transmission is detected, the procedure 900 proceeds to Step 940.

At Step 935, the procedure 900 further includes incrementing a redundancy count for all of the plurality of channels respectively. Therefore, whenever a consistent message is received on a particular channel, the redundancy count is incremented for all channels respectively, rather than merely incrementing the redundancy count for the particular channel alone.

At Step 940, the procedure 900 further includes resetting the redundancy count for all of the plurality of channels respectively, and resetting a period of time-based events for all of the plurality of channels respectively. Therefore, whenever an inconsistent message is received on the particular channel, the Trickle timers for all channels are reset. In other words, the redundancy counts for all channels respectively are reset to zero, the timers for all channels respectively are reset to zero, and the duration of the periods for all channels respectively is reset to the initial period duration.

At Step 945, the procedure 900 further includes transmitting the message on a single selected channel of the plurality of channels per time-based event, in response to each time-based event, such that the transmitting of the message occurs only when the redundancy count is less than a threshold value. As described above, when a time-based event occurs, e.g., when the timer fires, the particular device transmits data on the corresponding channel, provided that the redundancy count of that channel is less than a predetermined threshold value.

As shown in FIG. 10, the procedure 1000 may start at step 1005, continue to step 1010, and so forth, where, as described in greater detail above, asynchronous broadcast communication is performed based on time-based events in channel-hopping networks. Although FIG. 10 depicts steps in a particular order, it should be understood that the depicted embodiment is not limiting, and the particular order is depicted merely for illustration purposes.

At Step 1010, the procedure 1000 includes determining a plurality of channels in a channel-hopping network, on which a plurality of nodes communicate. As described above, many LLN devices must communicate using a channel-hopping link layer. This requirement is often driven by regulatory compliance, as well as the fact that channel-hopping systems offer better spectral efficiency.

At Step 1015, the procedure 1000 further includes identifying an asynchronous broadcast message to transmit from a particular node. As described above, it is often necessary to have a link-layer broadcast mechanism that does not require any synchronization, i.e., asynchronous, to communicate with neighboring devices. For example, IEEE 802.15.4 EBRs and EBs are used by devices to discover neighboring networks. Link-layer broadcast communication is necessary since devices do not know the addresses of neighboring devices.

At Step 1020, the procedure 1000 further includes determining a plurality of time-based events. As described above, for the purposes of the present disclosure, the firing of the timer may be considered a "time-based event." The Trickle algorithm operates according to the time-based events. For instance, when Trickle starts its execution in a particular channel, the corresponding redundancy count is set to zero, and the initial period begins, i.e., the timer begins to run. When the period expires, i.e., when the timer runs for the entirety of the period's duration, the redundancy count is reset to zero, the duration of the period is doubled, and a new period begins, i.e., the timer is reset to zero.

At Step 1025, the procedure 1000 further includes maintaining a shared set of time-based events for all of the plurality of channels. For the purposes of the present disclosure, the firings of the timer which are shared by all channels may be considered a "shared set of time-based events." In this regard, a single shared Trickle timer may be maintained for all channels. Similarly, a single shared set of Trickle-based variables and parameters, e.g., redundancy count, period duration, etc., may be maintained for all channels.

At Step 1030, the procedure 1000 further includes transmitting the message on a single selected channel of the plurality of channels per time-based event, in response to each time-based event, such that the channel on which the message is transmitted is selected randomly. As described above, when a time-based event occurs, e.g., when the timer fires, the particular device transmits data on the corresponding channel, provided that the redundancy count of that channel is less than a predetermined threshold value.

At Step 1035, the procedure 1000 further includes determining whether a period of the shared set of time-based events expires. If the period of the shared set of time-based events expires, the procedure 1000 proceeds to Step 1040.

At Step 1040, the procedure 1000 further includes incrementing a period count and restarting the period. The period count records the number of consecutive periods of the same duration. Upon execution of the Trickle algorithm, the period count may be initiated to zero. After the first period expires, the period count is incremented to a value of one. Along the same lines, after the second period expires, the period count is incremented to a value of two, since it is the second consecutive period with the same duration. The period count is illustrated in FIG. 7B and described in further detail above.

At Step 1045, the procedure 1000 further includes determining whether the period count exceeds a predetermined threshold. If the period count exceeds the predetermined threshold, the procedure 1000 proceeds to Step 1050.

At Step 1050, the procedure 1000 further includes increasing a duration of the period. Typically, the Trickle algorithm increases the duration of the period by doubling the current duration thereof. Accordingly, the Trickle period may only be increased after the number of periods (N) exceeds the predetermined threshold value. This may be done to achieve similar dissemination latencies as the asynchronous broadcast solution procedure in FIG. 9. If dissemination latency is not a concern, then N may equal 1. Alternatively, a factor other than 2 may be used to increase the Trickle period after each Trickle period expires.

It should be understood that the steps shown in FIGS. 8-10 are merely examples for illustration, and certain steps may be included or excluded as desired. Further, while a particular order of the steps is shown, this ordering is merely illustrative, and any suitable arrangement of the steps may be utilized without departing from the scope of the embodiments herein. Moreover, while the procedures 800-1000 are described separately, certain steps from each procedure may be incorporated into each other procedure, and the procedures are not meant to be mutually exclusive.

The techniques described herein, therefore, provide for efficient asynchronous broadcast communication based on time-based events in channel-hopping networks. In this regard, by having each node transmit data on a single channel at a time (rather than all channels back-to-back), this disclosed embodiments effectively spread the transmissions more evenly across nodes in the network. In doing so, the embodiments eliminate the issues identified above and improve performance by:

1) Balancing transmission load more evenly across devices by managing transmissions on each channel separately;

2) Reducing dissemination latency by making better use of spatial diversity;

3) Reducing queuing latency by eliminating back-to-back transmissions across all channels;

4) Reducing time-correlated internal interference by eliminating back-to-back transmissions across all channels; and 5) Reducing short-term energy requirements by eliminating back-to-back transmissions across all channels.

While there have been shown and described illustrative embodiments that provide for managing asynchronous broadcast communication based on time-based events in channel-hopping networks, it is to be understood that various other adaptations and modifications may be made within the spirit and scope of the embodiments herein. For example, the embodiments have been shown and described herein primarily with relation to LLN networks. However, the embodiments in their broader sense are not as limited, and may, in fact, be used with other types of networks and/or protocols. Similarly, the embodiments have been shown and described herein primarily with relation to the Trickle algorithm. However, the embodiments are not limited as such, and may incorporate any suitable dynamically adjusted timing algorithm for communication scheduling.

Moreover, the foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a channel-hopping network, e.g., an LLN, a processor coupled to the at least one network interface, and a memory configured to store program instructions executable by the processor. Further, it is expressly contemplated that the components and/or elements described herein can be implemented as software being stored on a tangible, non-transitory computer-readable medium (e.g., disks/CDs/RAM/EEPROM, etc.) having program instructions executable by a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a computer network device, a plurality of frequency channels in a low-power and lossy network (LLN) channel-hopping network on which a plurality of nodes communicate, wherein the LLN channel-hoping network transmits radio signals by rapidly switching a carrier among the plurality of frequency channels;

identifying, by the computer network device, an asynchronous broadcast message to transmit from the computer network device;

determining, by the computer network device, a plurality of time-based events based on a Trickle algorithm; and in response to each of the plurality of time-based events, transmitting, by the computer network device, the asynchronous broadcast message on a single selected frequency channel of the plurality of frequency channels per time-based event.

2. The method according to claim 1, further comprising:
maintaining time-based events for all of the plurality of frequency channels respectively.

3. The method according to claim 2, further comprising:
maintaining a redundancy count for all of the plurality of frequency channels respectively; and when a consistent transmission is detected in any frequency channel, incrementing a redundancy count for all of the plurality of frequency channels respectively, wherein
the transmitting of the message occurs only when the redundancy count is less than a threshold value.

4. The method according to claim 3, further comprising:
when an inconsistent transmission is detected in any frequency channel of the plurality of frequency channels, resetting the redundancy count for all of the plurality of frequency channels respectively, and resetting a period of time-based events for all of the plurality of frequency channels respectively.

5. The method according to claim 1, further comprising:
maintaining a shared set of time-based events for all of the plurality of frequency channels.

6. The method according to claim 5, further comprising:
when a period of the shared set of time-based events expires, incrementing a period count and restarting the period; and when the period count exceeds a predetermined threshold, increasing a duration of the period.

7. The method according to claim 1, further comprising:
randomly selecting the selected frequency channel on which the message is transmitted.

8. An apparatus, comprising:
one or more network interfaces that communicate with a low-power and lossy network (LLN) channel hopping network;
a processor coupled to the one or more network interfaces and configured to execute a process; and
a memory configured to store program instructions which contain the process executable by the processor, the process comprising:
determining a plurality of frequency channels in the channel-hopping network on which a plurality of nodes communicate, wherein the frequency channel-hoping network transmits radio signals by rapidly switching a carrier among the plurality of frequency channels;
identifying an asynchronous broadcast message to transmit from the apparatus;
determining a plurality of time-based events based on a Trickle algorithm; and
in response to each of the plurality of time-based events, transmitting the asynchronous broadcast message on a single selected frequency channel of the plurality of frequency channels per time-based event,
wherein the apparatus is a computer network device.

9. The apparatus according to claim 8, wherein the process further comprises:
maintaining time-based events for all of the plurality of frequency channels respectively.

10. The apparatus according to claim 9, wherein the process further comprises:
maintaining a redundancy count for all of the plurality of frequency channels respectively; and when a consistent transmission is detected in any frequency channel of the plurality of frequency channels, incrementing a redundancy count for all of the plurality of frequency channels respectively, wherein
the transmitting of the message occurs only when the redundancy count is less than a threshold value.

11. The apparatus according to claim 10, wherein the process further comprises:
when an inconsistent transmission is detected in any channel, resetting the redundancy count for all of the plurality of frequency channels respectively, and resetting a period of time-based events for all of the plurality of frequency channels respectively.

12. The apparatus according to claim 8, wherein the process further comprises:
maintaining a shared set of time-based events for all of the plurality of frequency channels.

13. The apparatus according to claim 12, wherein the process further comprises:
when a period of the shared set of time-based events expires, incrementing a period count and restarting the period; and when the period count exceeds a predetermined threshold, increasing a duration of the period.

14. The apparatus according to claim 8, wherein the process further comprises:
randomly selecting the selected frequency channel on which the message is transmitted.

15. A tangible non-transitory computer readable medium storing program instructions that cause a computer to execute a process in a computer network device, the process comprising:
determining a plurality of frequency channels in a low-power and lossy network (LLN) channel-hopping network on which a plurality of nodes communicate, wherein the channel-hoping network transmits radio signals by rapidly switching a carrier among the plurality of frequency channels;
identifying an asynchronous broadcast message to transmit from a particular node of the plurality of nodes;
determining a plurality of time-based events based on a Trickle algorithm; and
in response to each of the plurality of time-based events, transmitting, from the particular node, the asynchronous broadcast message on a single selected frequency channel of the plurality of frequency channels per time-based event.

16. The tangible non-transitory computer readable medium according to claim 15, further comprising:
maintaining time-based events for all of the plurality of frequency channels respectively;
maintaining a redundancy count for all of the plurality of frequency channels respectively;
when a consistent transmission is detected in any frequency channel of the plurality of frequency channels, incrementing a redundancy count for all of the plurality of frequency channels respectively; and
when an inconsistent transmission is detected in any frequency channel of the plurality of frequency channels, resetting the redundancy count for all of the plurality of frequency channels respectively, and resetting a period of time-based events for all of the plurality of frequency channels respectively, wherein
the transmitting of the message occurs only when the redundancy count is less than a threshold value.

* * * * *